(12) United States Patent
Ebner et al.

(10) Patent No.: US 7,806,800 B2
(45) Date of Patent: Oct. 5, 2010

(54) DRIVE TRAIN

(75) Inventors: Norbert Ebner, Ludwigsburg (DE); Andreas Schondelmaier, Erdmannshausen (DE)

(73) Assignee: Daimler AG, Stuttgart (DE)

( * ) Notice: Subject to any disclaimer, the term of this patent is extended or adjusted under 35 U.S.C. 154(b) by 534 days.

(21) Appl. No.: 11/656,021

(22) Filed: Jan. 19, 2007

(65) Prior Publication Data
US 2007/0149338 A1    Jun. 28, 2007

Related U.S. Application Data

(63) Continuation-in-part of application No. PCT/EP2005/007815, filed on Jul. 19, 2005.

(30) Foreign Application Priority Data

Jul. 28, 2004    (DE) .................... 10 2004 036 505

(51) Int. Cl.
F04B 49/00    (2006.01)
B60K 1/02    (2006.01)
B60K 6/42    (2006.01)
B60K 6/485    (2006.01)

(52) U.S. Cl. .................. 477/3; 477/7; 903/930; 903/912; 180/65.22; 180/65.26; 180/65.285; 417/16

(58) Field of Classification Search .......... 477/3, 477/7; 903/912, 948, 951, 930; 180/65.2, 180/65.3, 65.22, 65.26, 65.285; 417/16

See application file for complete search history.

(56) References Cited

U.S. PATENT DOCUMENTS

| 6,447,256 | B2 * | 9/2002 | Bussard ................. 417/16 |
| 6,863,140 | B2 * | 3/2005 | Noreikat et al. .......... 180/65.2 |
| 6,964,631 | B2 * | 11/2005 | Moses et al. ............ 477/3 |
| 7,056,260 | B2 * | 6/2006 | Nakamori et al. ........ 477/3 |

FOREIGN PATENT DOCUMENTS

| DE | 38 12 412 | 10/1989 |
| DE | 697 07 986 | 1/1998 |
| EP | 1 216 871 | 6/2002 |
| JP | 11 287316 | 10/1999 |
| WO | WO 99/25979 | 5/1999 |

OTHER PUBLICATIONS

Translation of IDS reference JP 11-287316.*

* cited by examiner

*Primary Examiner*—Tisha D Lewis
(74) *Attorney, Agent, or Firm*—Klaus J. Bach

(57) ABSTRACT

In a drive train and a method for operating the drive train for a motor vehicle, comprising a hydraulically shiftable transmission unit with an input shaft connectable to an internal combustion engine via a first clutch, a first electric motor, and an oil pump which supplies the transmission unit with pressurized oil and which is driven by the internal combustion engine or by an electric pump motor, the electric pump motor for driving the oil pump is in the form of a sensorless electric motor, and if required, the first electric motor is energized and coupled to the oil pump in order to assist starting the electric pump motor.

9 Claims, 2 Drawing Sheets

DRIVE TRAIN

This is a Continuation-in-Part Application of pending International Patent Application PCT/EP2005/007815 filed Jul. 19, 2005 and claiming the priority of German patent application 10 2004 036 505.9 filed Jul. 28, 2004.

BACKGROUND OF THE INVENTION

The invention relates to a method for operating a drive train of a motor vehicle including an oil pump driven by an electric motor for supplying pressurized oil for operating shifting elements, and also to a drive train arrangement of a motor vehicle.

DE 101 60 466 C1 discloses a drive train in which an oil pump supplies a hydraulically shifted transmission unit with pressurized oil. The oil pump can be driven by two devices, an internal combustion engine or an electric motor. At any time, the device with the higher speed is coupled to the oil pump. If the speed of the internal combustion engine is too low for adequate operation of the oil pump, the oil pump is driven by the electric motor. The drive train further includes a first and a second electric motor which, as required, can apply a torque to the transmission input shaft or can be used for starting the internal combustion engine. The second electric motor can also be used for driving with purely electromotive propulsion.

It is the object of the invention to provide for reliable starting of the electric motor for driving the oil pump with high reliability under all operating conditions.

SUMMARY OF THE INVENTION

In a drive train and a method for operating the drive train for a motor vehicle, comprising a hydraulically shiftable transmission unit with an input shaft an internal combustion engine which can be connected to the input shaft via a first clutch, a first electric motor, and an oil pump which supplies the transmission unit with pressurized oil and which is driven by the internal combustion engine or by an electric pump motor, the electric pump motor for driving the oil pump is in the form of a sensorless electric motor, and, if required, the first electric motor is energized and coupled to the oil pump in order to assist starting the electric pump motor.

In this way, the invention provides a method for operating a drive train in which, as required, an additional electric motor is energized and coupled to the oil pump to assist starting of the electric pump motor. In particular after a long standstill period of the oil pump, oil films formed between moving parts have dried, so that said parts adhere to one another. As a result, the torque required to rotate the oil pump is significantly increased as compared to normal conditions with adequate lubrication between the moving parts. Similarly, the starting torque is increased at low temperatures because of the high viscosity of the lubricating oil. To avoid dimensioning the electric motor for driving the oil pump to match these more difficult conditions while nevertheless ensuring high operating reliability, the oil pump is initially rotated by the first electric motor to reduce the starting torque for the electric pump motor permitting it to increase its speed under practically no load.

In a particular embodiment of the invention, the first electric motor is coupled to the oil pump via a self-actuating clutch. The clutch is in the form, for example, of a freewheel or a centrifugal clutch. Self-actuating clutches are highly reliable.

In a particular embodiment of the invention, the first electric motor is first energized and then the electric pump motor. If, for example, the vehicle is to be driven by electromotive propulsion alone, pressure of the oil pump is required to provide a non-positively coupled transmission unit. Before a second electric motor can exert torque on the input shaft of the transmission unit, therefore, the oil pump must be brought up to speed by the electric pump motor. To ensure starting of the electric pump motor under all operating conditions, the oil pump is initially rotated, if required, by the first electric motor before the electric pump motor starts. In this way, the electric pump motor can advantageously start under no load.

In a development of the invention, the first electric motor is energized simultaneously with the electric pump motor. Simultaneous energization prepares the drive train rapidly for service. The speed of the first electric motor increases faster than that of the electric motor; the electric pump motor can thus start under no pump load.

Energization of the first electric motor is switched off as soon as the electric pump motor reaches a predefined speed. From a predefined speed upward, the electric pump motor has sufficient torque to drive the oil pump, so that the first electric motor is switched off again.

Preferably, the starting assistance operation is initiated depending on the external temperature. The external temperature supplies an easily measurable value indicating whether a high pump starting torque is anticipated or not. Simultaneously, or alternatively, the standstill time of the vehicle which is detected by a control unit may, for example, also be taken into account. With knowledge of the temperature and/or the vehicle standstill time, starting assistance can be requested even prior to first position detection of the electric pump motor.

In a particular arrangement, the electric pump motor for driving the oil pump is in the form of a sensorless electric motor. Sensorless electric motors are distinguished by very high reliability and a small space requirement.

Preferably, a control unit of the electric pump motor is connected to a transmission and/or engine management system via a CAN bus. Advantageously, data can be interchanged between the control units, so that, for example, if an electromotive driving mode is desired and low external temperatures are present, the control unit of the electric pump motor can send a request for starting assistance to the engine control unit and the oil pump is initially rotated by the first electric motor.

Preferably, the oil pump is in the form of a crescent gear pump. The oil pump has an externally-toothed gear wheel and an internally-toothed gear wheel. The externally-toothed gear wheel is driven alternatively by the internal combustion engine, by the electric pump motor or, for starting assistance, by the first electric motor. The crescent gear pump advantageously makes possible a simple arrangement of the drive modes and enables implementation of starting assistance.

Further features and combinations of features are apparent from the following description of specific exemplary embodiments of the invention on the basis of the accompanying drawings:

DESCRIPTION OF A PARTICULAR EMBODIMENT

Figure 1:
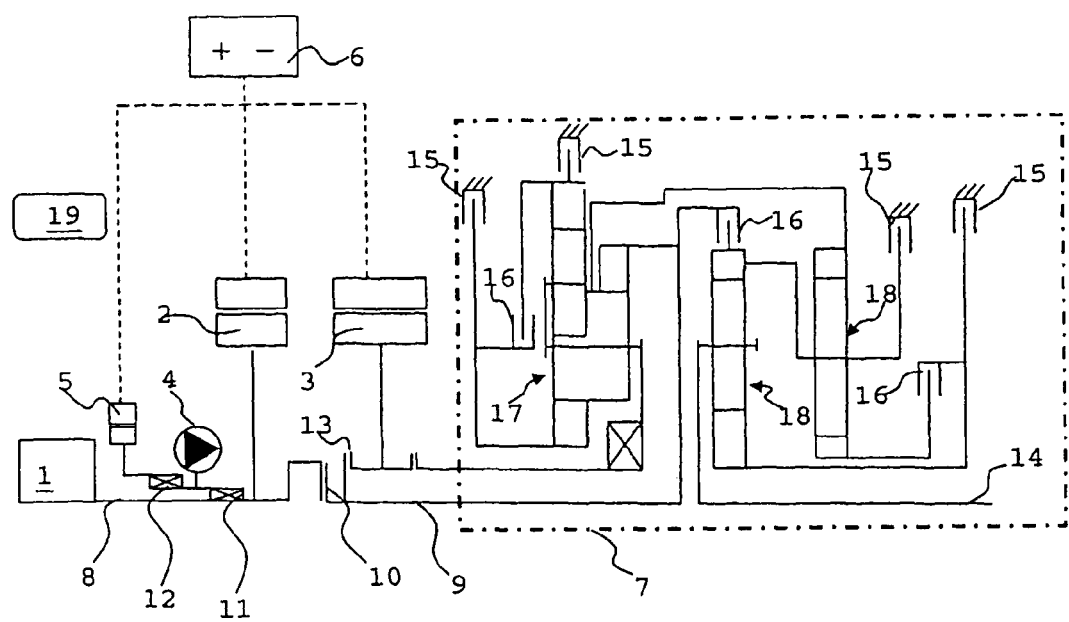
FIG. 1 is a schematic representation of a drive train according to the invention for executing the method according to the invention.

FIG. 1 schematically shows a drive train according to the invention which comprises an internal combustion engine 1, a first and a second electric motor 2, 3, a storage battery unit 6, a transmission unit 7 and an oil pump 4 in the form of a crescent gear pump which can be driven by a electric pump motor 5. The output shaft 14 of the transmission unit 7 is connected to driven wheels (not shown) of a motor vehicle. The oil pump 4 delivers oil for lubricating the transmission unit 7 and supplies oil pressure for actuating hydraulically operated clutches 10, 13, 16 and brakes 15.

The internal combustion engine 1 acts on a shaft section 8 which can be connected via a first hydraulically operated clutch 10 to an input shaft 9 of the transmission unit 7.

The oil pump 4 is connected via a first freewheel 11 to the shaft section 8 and via a second freewheel 12 to the electric pump motor 5. The oil pump 4 is therefore driven by the electric pump motor 5 or the internal combustion engine 1, depending on whether the engine 1 or motor 5 has the higher speed.

The electric pump motor 5 is preferably in the form of a sensorless drive motor, since this ensures high reliability and low weight and at the same time has a small space requirement.

The first electric motor 2 is connected to the shaft section 8. The first electric motor 2 can be used for starting the internal combustion engine 1 and, with the first clutch 10 engaged, for recuperating, i.e. feeding back, braking energy to the storage battery unit 6 or for supplying a drive torque to the output shaft 14.

The second electric motor 3 can be connected via a second, hydraulically operated clutch 13 to the transmission input shaft 9. With the first clutch 10 disengaged and the second clutch 13 engaged, therefore, a driving mode with purely electromotive propulsion is made possible. For this purpose, driving of the oil pump 4 by the electric pump motor 5 is required. With the second clutch 13 engaged, a further operating possibility is the recuperation of braking energy. The second electric motor 3 can also be used in combination with the first electric motor to implement a difficult start of the internal combustion engine 1. A precondition of this is engagement of the first and second clutches 10, 13.

The transmission unit 7 is in the form of a planetary transmission with one Ravigneaux set 17 and two simple planetary sets 18. Different ratio steps of the transmission unit 7 are implemented by changing the combinations of engaged and disengaged transmission clutches 16 and brakes 15 which are hydraulically actuated.

A storage battery unit 6 supplies the electric motors 2, 3 and the electric pump motor 5 with electrical energy.

The method according to the invention facilitates a reliable start-up of the electric pump motor 5 under difficult operating conditions such as low temperatures and/or starting after prolonged standstill. Under these conditions, the initial rotation of the oil pump 4 requires a torque higher than that required under normal operating conditions. The reason is the mutual adhesion of the moving parts, that is, of the gear wheels to the pump housing. The oil pump 4 is started up by the first electric motor; simultaneously or directly afterwards the electric pump motor 5 is energized. The electric pump motor 5 can now accelerate to a predetermined speed under no load. As soon as this speed is reached, the first electric motor 2 is switched off and uncoupled via the freewheel 11.

The oil pump 4 now builds up pressure so that, for example, the second clutch 13 and transmission clutches 16 and brakes 15 can be engaged and the vehicle can be driven with electric propulsion.

A modified method provides that the oil pump 4 is rotated by the first electric motor 2 even shortly prior to starting of the internal combustion engine 1. This rotation has the effect that a lubrication film is formed between the moving parts of the oil pump 4, so that the drive torque required, for example, after prolonged standstill is reduced. Subsequent starting of the internal combustion engine 1 using the first electric motor 2 can therefore be executed more reliably.

A modified embodiment provides that the first electric motor 2 can also be coupled to the rotor of the electric pump motor 5.

As a result of the method, the electric pump motor 5 advantageously does not need to be designed to provide the starting torque required by the oil pump 4 under extreme conditions such as low temperatures. In particular, this method makes possible the use of a sensorless electric motor as the pump drive motor. Together with advantages such as high reliability, sensorless electric motors have the disadvantage that they generate only a relatively low torque at low speeds. This disadvantage is compensated for by the use of the inventive method. Reliability and system-availability are considerably increased by the inventive starting assistance according to the invention.

Activation of the first and second clutches 10, 13 and control of the electric pump motor 5 are effected via a control unit 19 which is preferably networked with further control units (not shown) of the drive train such as an engine and/or transmission control unit.

Figure 2:
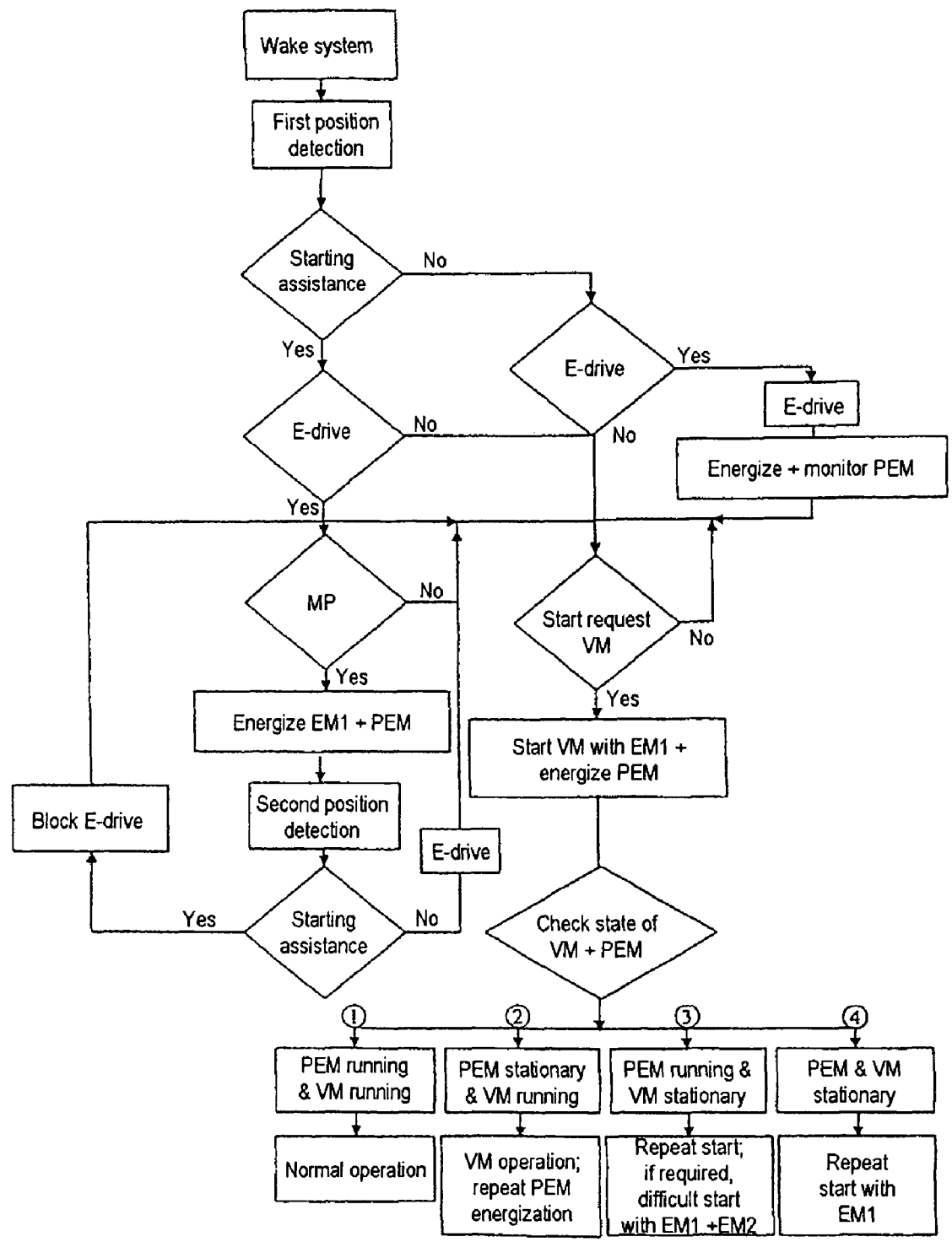
FIG. 2 is a flow circuit diagram of the method according to the invention used in the arrangement according to FIG. 1.

FIG. 2 shows a flow diagram concerning the method according to the invention which is executed each time the vehicle is put into operation. Entering the vehicle, for example opening the vehicle doors, causes control units of the drive train to be activated. Directly thereafter, a first position detection of the electric pump motor 5 (denoted by PEM in FIG. 2), in the form of a sensorless three-phase-current motor, is carried out. If it is found that the rotor is not rotating during the position detection, starting assistance is requested for a subsequent drive operation, which is performed solely with electric propulsion by another electric motor 3 (referred to in FIG. 2 as E-drive).

Before initiating rotation of the electric motor, a check is made as to whether energization and starting of the first electric motor 2 is permissible within the context of a monitoring plan. In FIG. 2, the monitoring plan is denoted by MP and the first electric motor 2 by EM1. The monitoring plan precludes states in which the vehicle would be set in motion upon initial rotation of the first electric motor 2. If energization of the first electric motor 2 is not permissible, therefore, the system switches to internal combustion engine propulsion. If energization is permitted, the first electric motor 2 is energized simultaneously with the electric pump motor 5. Alternatively, the electric pump motor 5 can be delayed, that is, it can take place before or after energization of the first electric motor 2. The electric pump motor 5 can therefore increase its speed largely under no load, starting from zero. When starting from standstill, sensorless drive motors deliver significantly lower torque than their rated torque. The problem of starting is advantageously solved in that the first electric motor 2 assists the electric pump motor 5 during starting. As soon as the electric pump motor 5 has reached a speed at which sufficient torque is available for driving and a further speed increase of the oil pump 4, the first electric motor 2 is switched off.

According to FIG. 2, a step in which second condition detection of the electric pump motor 5 is carried out. If the electric pump motor 5 is not in operation as expected, operation of the vehicle by electromotive propulsion is blocked. There now remain in principle the possibilities of either repeating the start attempt or switching to internal combustion engine propulsion. If, on the other hand, the interrogation yields the result that the electric pump motor 5 is running and that the oil pump 4 is building up pressure, the second clutch 13, in the form of a multi-plate clutch, is then actuated hydraulically and engaged, so that the vehicle can be driven using the second electric motor 3 (see FIG. 1). E-drive alone is maintained until a start request for the internal combustion engine 1, denoted by VM in FIG. 2, is issued. During a start request, an ignition key is turned until the first electric motor 2 is energized to start the internal combustion engine 1 (e.g. start position KL 50). Similarly, a control unit responsible for drive management can detect that the internal combustion engine must be started, for example, because of empty batteries.

If the first position detection shows that the electric pump motor 5 is turning and no starting assistance is required, an interrogation is carried out to determine whether drive should be effected by electromotive propulsion or by internal combustion engine propulsion. In the case of E-drive, the electric pump motor 5 is energized and continuously monitored and E-drive alone is maintained until a start request for the internal combustion engine 1 is issued. If the interrogation yields the result that driving with the internal combustion engine 1 is desired, a check is made as to whether a start request is already present. This check is executed in an interrogation loop until a start request is actually issued. Once the start request is present, the internal combustion engine 1 is started using the first electric motor. If it does not take place despite preceding E-drive, the electric pump motor 5 is energized. The oil pump 4 is now driven by the drive which is running faster, i.e. by the internal combustion engine 1 or the electric pump motor 5.

In a last step, after the internal combustion engine 1 and the electric pump motor 5 have been started, their operating state is checked. Here, a distinction is to be drawn between the following cases with associated driving strategies:
1. The electric pump motor 5 and the internal combustion engine 1 are running normally.
2. The electric pump motor 5 is stationary and the internal combustion engine 1 is running normally. The oil pump 4 is driven by the internal combustion engine 1 and E-drive is blocked. In addition, the attempt to start the electric pump motor 5 is continued, for example, when the operating temperature has risen.
3. The electric pump motor 5 is running and the internal combustion engine 1 is stationary. In this case, starting of the internal combustion engine 1 with the first electric motor 2 is repeated. Alternatively, a difficult start of the internal combustion engine 1 may be carried out by the first clutch 10 being engaged and the internal combustion engine 1 then being started using the first and second electric motors 2, 3.
4. The electric pump motor 5 and the internal combustion engine 1 are stationary. In this case, starting is repeated using the first electric motor 2.

The method according to the invention is not restricted to a drive train having a planetary transmission but self-evidently can also be applied to other types of drive trains having, for example, an automated manual transmission or a stepless transmission.

What is claimed is:

1. A method for operating a drive train of a motor vehicle, including at least a first electric drive train motor (2) and an oil pump (4) for supplying shift elements with pressurized oil, the drive train comprising an electric pump motor (5) engageable with the oil pump for driving the oil pump (4), and the first electric drive train motor (2) of the motor vehicle drive train including a self-actuating clutch (11) for also engaging the first electric drive train motor (2) with the oil pump (4), the method comprising the steps of: first, energizing one of the first electric drive train motor (2) and the electric pump motor (5) and, also energizing the other one of the electric motors for assisting starting operation of the oil pump (4).

2. The method as claimed in claim 1, wherein the electric pump motor (5) is energized first and subsequently, if needed, the first electric drive train motor (2) is energized to assist start-up of the electric pump motor (5).

3. The method as claimed in claim 1, wherein the first electric drive train motor (2) is energized first and subsequently the electric pump motor (5) is energized.

4. The method as claimed in claim 1, wherein the first electric drive train motor (2) and the electric pump motor (5) are energized simultaneously.

5. The method as claimed in claim 2, wherein energization of the first electric drive train motor (2) is discontinued as soon as the electric pump motor (5) reaches a predefined speed.

6. The method as claimed in claim 1, wherein, below a predefined temperature, a starting assistance operation is always carried out.

7. A drive train for a motor vehicle, comprising;
a hydraulically shiftable transmission unit having an input shaft connectable to an internal combustion engine (1) via a first clutch (10),
a first electric drive train motor (2), and
an oil pump (4) which is provided to supply the transmission unit with pressurized oil and which is driven selectively by the internal combustion engine (1) via a first freewheel clutch (11) and by an electric pump motor (5) via a second free-wheel clutch (12), the electric pump motor (5) for driving the oil pump (4) being a sensorless electric motor, and
the first electric drive train motor (2) being connectable to the oil pump (4) for assisting start-up of the oil pump (4).

8. The drive train as claimed in claim 7, wherein a control unit (19) of the electric pump motor (5) is connected to a transmission or engine management system via a CAN bus.

9. The drive train as claimed in claim 7, wherein the oil pump (4) is a crescent gear pump.

* * * * *